United States Patent
Shinoto

(10) Patent No.: US 11,681,241 B2
(45) Date of Patent: Jun. 20, 2023

(54) PROCESSING APPARATUS FOR POWDER DISCHARGE RECOVERY

(71) Applicant: FUJIFILM Business Innovation Corp., Tokyo (JP)

(72) Inventor: Keigo Shinoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/539,259

(22) Filed: Dec. 1, 2021

(65) Prior Publication Data
US 2023/0055858 A1  Feb. 23, 2023

(30) Foreign Application Priority Data

Aug. 23, 2021 (JP) .............................. JP2021-135476

(51) Int. Cl.
| | |
|---|---|
| G03G 21/10 | (2006.01) |
| G03G 15/08 | (2006.01) |
| G03G 21/12 | (2006.01) |
| G03G 21/18 | (2006.01) |

(52) U.S. Cl.
CPC ......... *G03G 15/0865* (2013.01); *G03G 21/10* (2013.01); *G03G 21/105* (2013.01); *G03G 21/12* (2013.01); *G03G 21/1832* (2013.01); *G03G 2221/1624* (2013.01)

(58) Field of Classification Search
CPC .. G03G 15/0865; G03G 21/10; G03G 21/105; G03G 21/12; G03G 2221/1624; G03G 21/1832; G03G 2221/1648
See application file for complete search history.

(56) References Cited

U.S. PATENT DOCUMENTS

| | | | | |
|---|---|---|---|---|
| 5,594,541 | A * | 1/1997 | Bonislawski, Jr. | .... G03G 21/12 399/102 |
| 8,270,852 | B2 | 9/2012 | Ando et al. | |
| 8,290,421 | B2 | 10/2012 | Sato et al. | |
| 2009/0052961 | A1* | 2/2009 | Kawamoto | ........ G03G 15/6502 399/390 |
| 2009/0269111 | A1* | 10/2009 | Fukunaga | .............. G03G 21/12 399/358 |

FOREIGN PATENT DOCUMENTS

| | | |
|---|---|---|
| JP | 2011-095462 A | 5/2011 |
| JP | 2011-095466 A | 5/2011 |

\* cited by examiner

*Primary Examiner* — Arlene Heredia
*Assistant Examiner* — Laura Roth
(74) *Attorney, Agent, or Firm* — Oliff PLC

(57) ABSTRACT

A processing apparatus including an apparatus housing, powder processing unit for processing powder, a powder recovery unit for recovering discharged powder, a powder discharge unit for transporting and discharging the powder to a discharge portion to be recovered, and a powder receiver. The powder recovery unit is attached to the apparatus housing and the power receiver is positioned below the powder recovery unit on the same side of the apparatus housing that the powder recovery unit is attached to the apparatus housing. When the powder recovery unit is detached from the apparatus housing, the powder receiving unit receives powder discharge falling from the discharge portion.

18 Claims, 12 Drawing Sheets

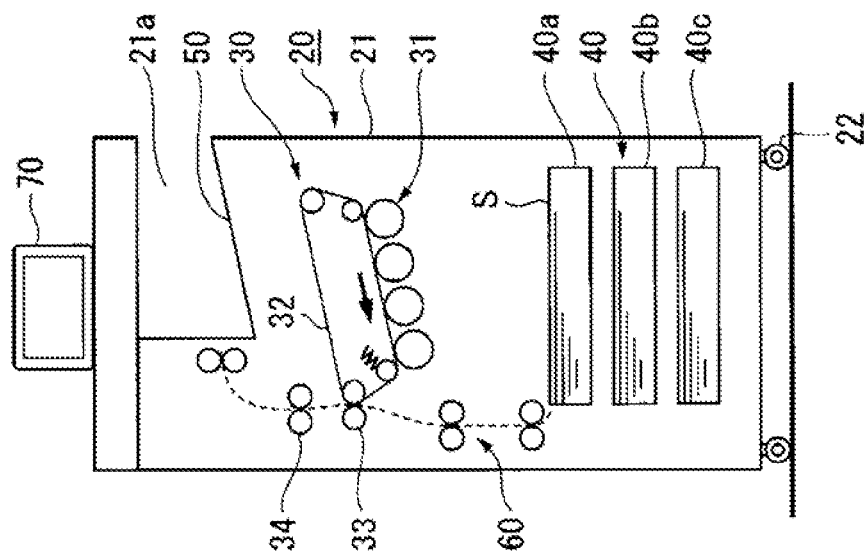
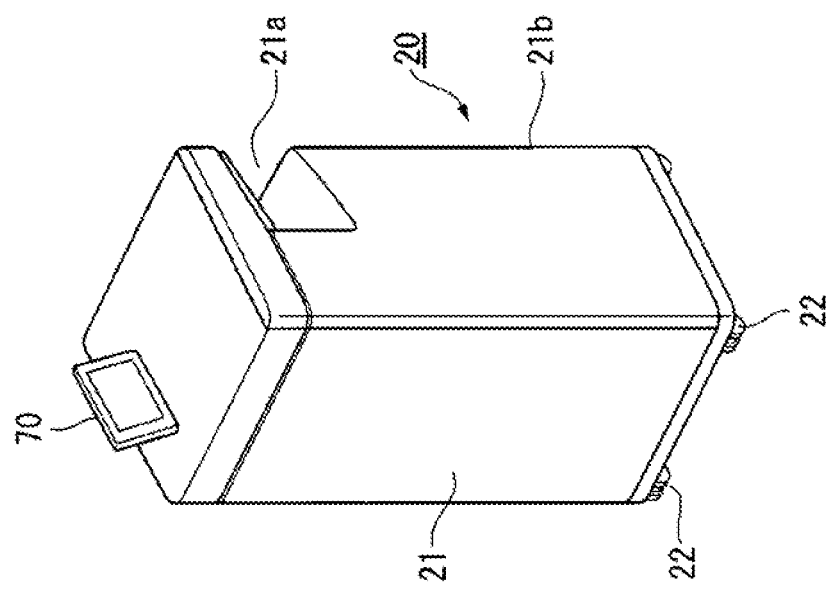

PROCESSING APPARATUS FOR POWDER DISCHARGE RECOVERY

CROSS-REFERENCE TO RELATED APPLICATIONS

This application is based on and claims priority under 35 USC 119 from Japanese Patent Application No. 2021-135476 filed Aug. 23, 2021.

BACKGROUND

(i) Technical Field

The present disclosure relates to a processing apparatus that performs processing with powder.

(ii) Related Art

As a processing apparatus that performs processing with powder, for example, a processing apparatus described in Japanese Unexamined Patent Application Publication No. 2011-95462 (refer to Detailed Description and FIG. 17) has been known.

Japanese Unexamined Patent Application Publication No. 2011-95462 discloses a developer recovery container having: a recovery opening formed so as to face a storage chamber that stores the recovered developer; a pair of shutters that opens and closes the recovery opening by being rotated toward the storage chamber by respective rotating shafts arranged at two positions with the recovery opening interposed between the positions; a film that is mounted on each of the shutters and seals a gap formed, between the distal ends of the pair of shutters, by the shutters overlapping on one another at their distal ends when the shutters are at positions where the shutters close the recovery opening; and a torsion spring that urges a corresponding one of the shutters in the direction where the shutter moves to close the recovery opening.

SUMMARY

Aspects of non-limiting embodiments of the present disclosure relate to suppression of powder fouling. Regarding an aspect in which a powder recovery unit is detachably attached to an apparatus housing while facing an opening of the apparatus housing, and, among the powder used in the powder processing unit, the powder to be recovered is recovered into the powder recovery unit via a powder discharge unit, compared with an aspect without a powder receiver, it is intended to suppress the powder that falls from a discharge portion of the powder discharge unit from fouling when the powder recovery unit is detached from the apparatus housing.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a processing apparatus including: an apparatus housing; a powder processing unit that is mounted in the apparatus housing and performs processing with powder; a powder recovery unit that is detachably attached to the apparatus housing and recovers powder discharged from the powder processing unit; a powder discharge unit extending from the powder processing unit toward the powder recovery unit, the powder discharge unit having a discharge portion, the powder discharge unit transporting and discharging the powder to be recovered, to the powder recovery unit; and a powder receiver positioned below the powder recovery unit, the powder receiver being provided on the apparatus housing on the side where the powder recovery unit is detached from the apparatus housing, the powder receiver receiving powder falling from the discharge portion of the powder discharge unit when the powder recovery unit is detached from the apparatus housing.

BRIEF DESCRIPTION OF THE DRAWINGS

An exemplary embodiment of the present disclosure will be described in detail based on the following figures, wherein:

FIG. 2A is an external view of an image forming apparatus, as a processing apparatus, according to a first exemplary embodiment;

FIG. 2B illustrates the outline of the overall configuration of the image forming apparatus in FIG. 2A;

DETAILED DESCRIPTION

Outline of Exemplary Embodiment

Figure 1A:
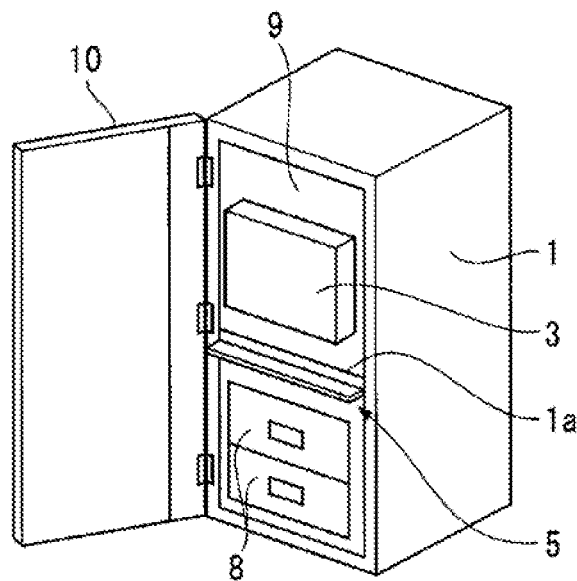
FIG. 1A is an external view illustrating the outline of an exemplary embodiment of a processing apparatus to which the present disclosure is applied.
Figure 1B:
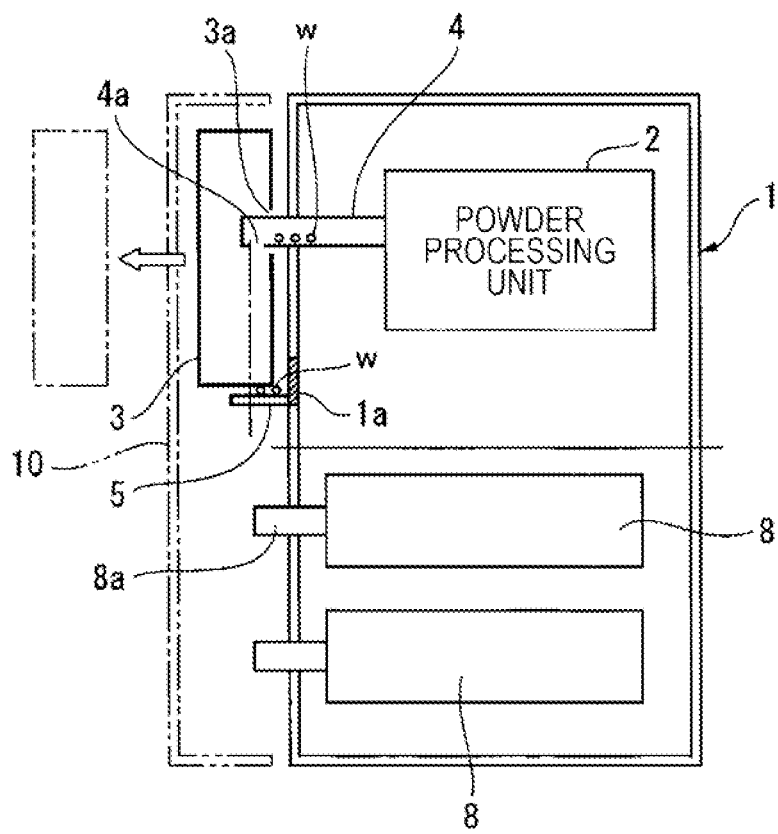
FIG. 1B illustrates a related part of the processing apparatus.

FIG. 1A is an external view illustrating the outline of an exemplary embodiment of a processing apparatus to which the present disclosure is applied, and FIG. 1B illustrates a related part of the processing apparatus.

In FIGS. 1A and 1B, the processing apparatus includes: an apparatus housing 1; a powder processing unit 2 that is mounted in the apparatus housing 1 and performs processing with powder; a powder recovery unit 3 that is detachably attached to the apparatus housing 1 and recovers powder discharged from the powder processing unit 2; a powder discharge unit 4 extending from the powder processing unit 2 toward the powder recovery unit 3, the powder discharge unit 4 having a discharge portion 4a, the powder discharge unit 4 transporting and discharging the powder to be recovered, to the powder recovery unit 3; and a powder receiver 5 positioned below the powder recovery unit 3, the powder receiver 5 being provided on the apparatus housing 1 on the side where the powder recovery unit 3 is detached from the apparatus housing 1, the powder receiver 5 receiving powder w falling from the discharge portion 4a of the powder discharge unit 4 when the powder recovery unit 3 is detached from the apparatus housing 1.

It is also possible to view the powder receiver 5 from another angle, that is, the powder receiver 5 is positioned below the powder recovery unit 3, the powder receiver 5 being provided on the apparatus housing 1 on the side where the powder recovery unit 3 is detached from the apparatus housing 1, the powder receiver 5 protruding further toward the side where the powder recovery unit 3 is detached from the apparatus housing 1 than the discharge portion 4a of the powder discharge unit 4 by 2 mm or more.

Regarding such a technical unit, examples cf the powder processing unit 2 widely include various units that perform processing with powder such as a unit that forms an image on a medium by using an image-forming powder (for example, toner) and a unit that applies a coating to a coating target object by using a coating powder.

The powder recovery unit 3 may be any unit that recovers the powder discharged at the powder processing unit 2. Such a powder recovery unit 3 may be detachably attached to the apparatus housing 1 and may be detached therefrom when becoming full of the powder to be recovered, and a new powder recovery unit 3 may be attached to the apparatus housing 1. Note that examples of the powder recovery unit 3 may include, other than a unit that stores ultimately the powder to be recovered, a unit that transports the powder recovered temporarily therein to a powder storage unit that is provided as a different unit and stores ultimately the temporarily recovered powder.

The powder discharge unit 4 may be any unit that connects a single or plural processing portions of the powder processing unit 2 to the recovery portion 3a of the powder recovery unit 3 and transports the powder to be recovered, to discharge the powder through the discharge portion 4a. The recovery portion 3a of the powder recovery unit 3 and the discharge portion 4a of the powder discharge unit 4 here commonly have respectively a recovery opening and a discharge opening. There are used the recovery portion 3a and the discharge portion 4a each having an opening and closing lid or a seal structure that closes a corresponding one of the recovery opening and the discharge opening when the powder recovery unit 3 and the powder discharge unit 4 are not connected to one another. The opening and closing lid or the seal structure opening the corresponding opening when the powder recovery unit 3 and the powder discharge unit 4 are connected to one another.

Next, a representative aspect or other aspects of the processing apparatus according to the present exemplary embodiment will be described.

First, a representative aspect of the powder receiver 5 is a member having a visor shape protruding further toward the outside of the apparatus housing 1 (corresponding to the side toward which the powder recovery unit 3 moves during detachment) than the discharge portion 4a of the powder discharge unit 4.

The "visor shape" here means a form in which a portion protruding toward the outside relative to a vertically extending side surface of the apparatus housing 1 sticks out like a visor. Examples of such a visor-shaped member include an aspect in which a protruding portion sticks out substantially horizontally in the sticking-out direction and an aspect in which a protruding portion sticks cut diagonally downward or diagonally upward and is thus inclined relative to the horizontal direction. However, regarding such an aspect in which a protruding portion sticks out diagonally, the degree of inclination may be adjusted so that powder does not slide down, or a blocking portion for blocking powder may be provided at the distal end of the protruding portion.

In the present example, the apparatus housing 1 may have an opening 9 through which the powder recovery unit 3 is attached to and detached from the apparatus housing 1, and an aspect of the powder receiver 5 may be, for example, a visor-shaped member continuously extending in the direction intersecting the opening 9. Here, the visor-shaped member may have the same width throughout the visor-shaped member, or a portion of the visor-shaped member corresponding to the discharge portion 4a of the powder discharge unit 4 may have a width larger than the width of the other portion of the visor-shaped member. Note that the visor-shaped member is not limited to a member extending substantially straight in the direction intersecting the opening 9 and may have a shape bending like a gentle V shape.

In addition, an aspect of the powder receiver 5 may be formed by utilizing a housing element 1a constituting the apparatus housing 1. The housing element 1a here includes a frame member forming the frame of the apparatus housing 1, an exterior member covering the outer side of the frame member, and an interior member provided on the inner side of the exterior member, and the powder receiver 5 may be integrally or separately provided on at least one of the frame member and the interior member. At this time, the powder receiver 5 may be provided by utilizing one of the frame member and the interior member or may alternatively be provided so as to extend over both the frame member and the interior member.

In the present example, an aspect of the powder receiver 5 may protrude in the shape of a visor from a bottom portion of a vertical wall, extending in the up-and-down direction, of at least one of the frame member and the interior member. The present example may enable the received powder w to effectively be suppressed from moving into the apparatus housing 1 by utilizing the vertically wall of at least one of the frame member and the interior member.

In addition, an aspect of the apparatus housing 1 may have: the opening 9 through which the powder recovery unit 3 is attached to and detached from the apparatus housing 1; and an opening and closing door 10 that opens and closes the opening 9, the opening and closing door 10 being at an open position in a region other than the region below the powder recovery unit 3 when the opening 9 is open. In an aspect of the opening and closing door whose open position when being open is below the powder recovery unit 3, when the powder recovery unit 3 is detached from the apparatus housing 1 and even if powder falls from the discharge portion 4a of the powder discharge unit 4, the opening and closing door is capable of functioning as a receiving member for powder. However, in an aspect adopting another system for the opening and closing door 10, there is concern that, when falling from the discharge portion 4a of the powder discharge unit 4, the powder w may foul the vicinity of a portion of the apparatus housing 1 on the side where the powder recovery unit 3 is detached from the apparatus housing 1. In contrast, the present example includes the powder receiver 5 that receives the powder w falling from the discharge portion 4a of the powder discharge unit 4, and there may thus be no concern that the powder w that has fallen will foul the vicinity of the apparatus housing 1 even if there is no opening and closing door whose open position is below the powder recovery unit 3.

Moreover, an aspect of the processing apparatus may include a medium container 8 provided, in the apparatus housing 1, below the powder processing unit 2, the powder recovery unit 3, and the powder discharge unit 4. The powder receiver 5 may be positioned above the medium container 8 and may protrude further toward the user operation side (corresponding to the outside of the apparatus housing 1) than an operation portion 8a of the medium container 8 that a user operates. The medium container 8 here is not limited to a medium supply unit that supplies the powder processing unit 2 with a medium and may also be a unit that accommodates the medium that has been subjected to processing.

An aspect of the processing apparatus in the present example may be an aspect in which the apparatus housing 1 has the opening 9 through which the powder recovery unit 3 is attached to and detached from the apparatus housing 1, the powder recovery unit 3 and the medium container 8 are provided so as to face the opening 9, and the opening and closing door 10 capable of closing the opening 9 to conceal entirely the powder recovery unit 3 and the medium container 8 is provided. The opening and closing door 10 conceals the mounted elements in the apparatus housing 1, and the present example may thereby provide the processing apparatus having a simple appearance.

First Exemplary Embodiment

Hereinafter, an exemplary embodiment of the present disclosure illustrated in the accompanying drawings will be described in more detail.

FIG. 2A illustrates the overall configuration of an image forming apparatus, as a processing apparatus, according to a first exemplary embodiment.

Overall Configuration of Image Forming Apparatus

In FIG. 2A, the image forming apparatus 20 has an apparatus housing 21 capable of moving on plural casters 22 when being conveyed, and the elements required for image forming are mounted in the apparatus housing 21.

Apparatus Housing

Figure 4:
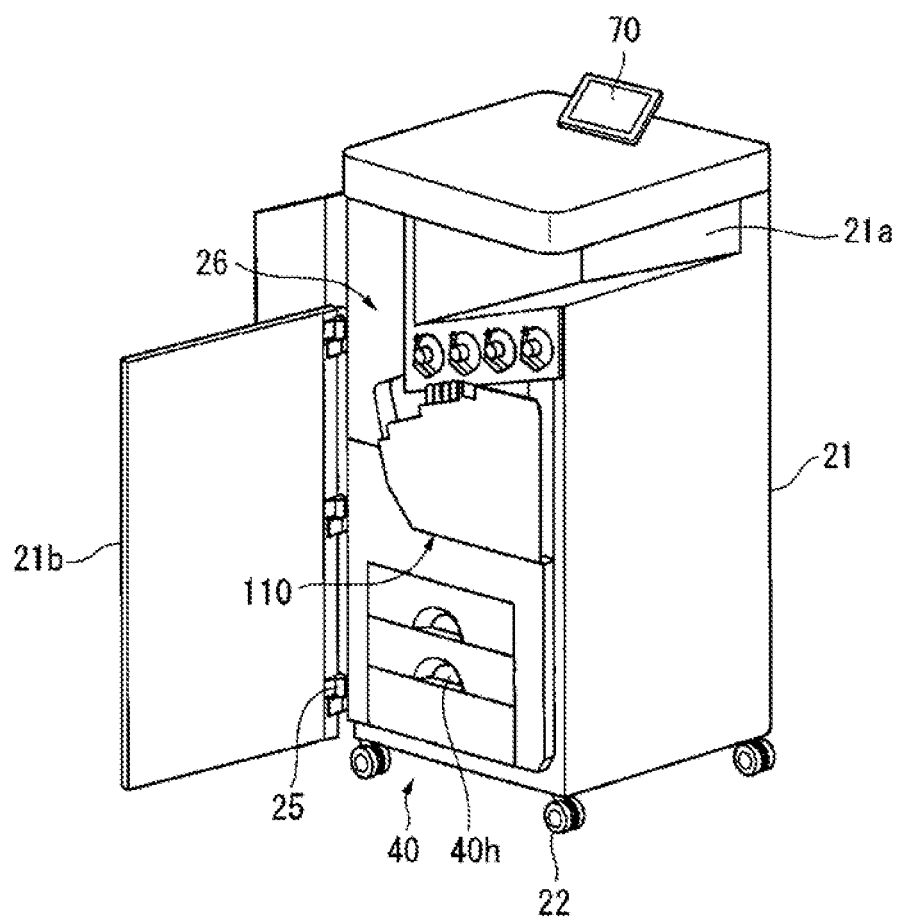
FIG. 4 is a schematic external view of the image forming apparatus when an opening and closing door is open.

The apparatus housing 21 in the present, exemplary embodiment, has a vertically oriented, substantially rectangular parallelepiped shape. When the user operation side is the front side, a hollow 21a is formed in a side face of the apparatus housing 21 (the side face on the right in FIG. 2A) adjacent to the front side and positioned near the top. An opening and closing door 21b capable of opening and closing is further provided on the front side of the apparatus housing 21. In particular, as FIG. 4 illustrates, the opening and closing door 21b in the present exemplary embodiment is capable of rotating about a support shaft 25. The support shaft 25 is provided in one corner portion of the front side of the apparatus housing 21 and extending in the vertical direction. The opening and closing door 21b opens and closes an opening 26 formed across the substantially entire region of the face on the front side of the apparatus housing 21 except for the hollow 21a.

Elements Required for Image Forming

As FIG. 2B and other figures illustrate, the elements required for image forming in the present exemplary embodiment are: an image forming engine 30 that is mounted in an upper region in the apparatus housing 21 and forms an image on a medium S such as a paper sheet; a medium supply device 40 that is mounted in a lower region in the apparatus housing 21 and supplies a medium S such as a paper sheet toward the image forming engine 30; a discharged-medium receiver 50 provided by utilizing the hollow 21a of the apparatus housing 21, the discharged-medium receiver 50 discharging and holding thereon the medium S on which an image has been formed at the image forming engine 30; a medium transport system 60 that transports the medium S supplied from the medium supply device 40, via the image forming engine 30, to the discharged-medium receiver 50; and an operation panel 70 that is provided on a top portion of the apparatus housing 21 and with which an operation required to form an image is performed to operate a controller (not illustrated) that controls the image forming engine 30, the medium supply device 40, and the medium transport system 60.

As FIG. 2B illustrates, the present exemplary embodiment adopts, but certainly not limited to, the image forming engine 30 including: plural image forming sections 31 that form images of plural color components on plural photoconductors by using, for example, an electrophotographic system; an intermediate transfer body 32 having, for example, a belt, shape, the intermediate transfer body 32 first-transferring thereon the images of color components of the respective image forming sections 31 and transporting the images of color components; a transfer device 33 that transfers the first-transferred images formed on the intermediate transfer body 32 onto a medium S; and a fixing device 34 that fixes the transferred images to the medium S.

The medium supply device 40 in the present exemplary embodiment is provided with three medium supply portions 40a to 40c. Note that the design of the medium supply device 40, that is, for example, the number and the layout of the medium supply portions may appropriately be changed, and a manual type medium supply portion may also be added as required.

The design of the discharged-medium receiver 50 may also be changed appropriately according to the position where a medium S is discharged. In addition, regarding the medium transport system 60, in the present exemplary embodiment, a transporting method in which an image is formed on one side of a medium S is adopted; however, images may alternatively be formed on both sides of a medium S by, for example, a duplex transporting module being added.

Configuration Example of Image Forming Section

Figure 3A:
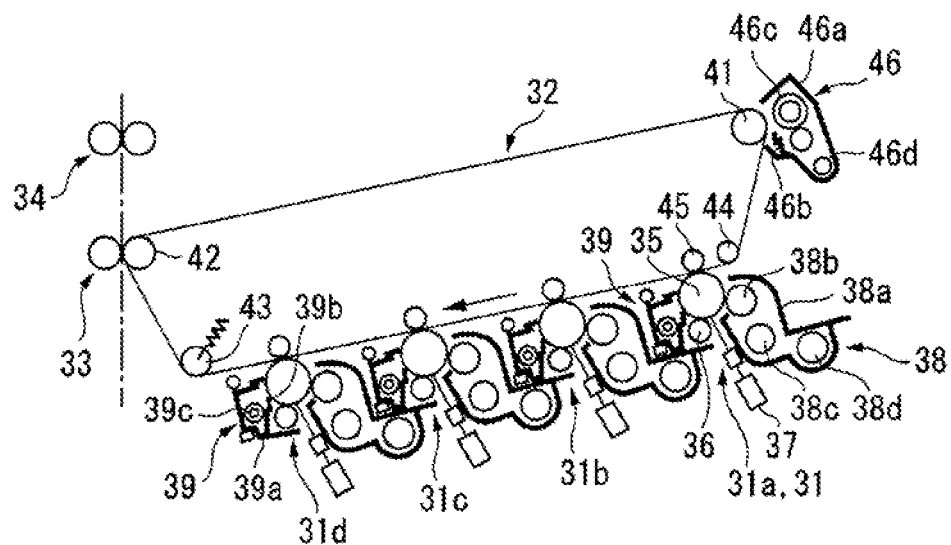
FIG. 3A illustrates a configuration example of an image forming engine illustrated in FIG. 2B.

As FIG. 3A illustrates, the image forming sections 31 in the present exemplary embodiment form images of, for example, four color components (yellow (Y), magenta (M), cyan (C), and black (K) in the present exemplary embodiment). The image forming sections 31 are arranged in a row while being inclined slightly diagonally downward, relative to the substantially horizontal attitude, toward the left in FIG. 2B. A configuration of each of the image forming sections 31 (specifically, 31a to 31d), into which a system such as an electrophotographic system is adopted, includes; a photoconductor 35 having a drum shape; a charger 36 that charges the photoconductor 35; a writing head 37 that performs writing by using light of, for example, an LED array to form an electrostatic latent image on the photoconductor 35 charged by the charger 36; a developing unit 38 that develops the electrostatic latent image formed by the writing head 37, by using toner of powder (a two-component developer containing toner and carrier is used in the present exemplary embodiment); a photoconductor cleaner 39 that, cleans residue (containing largely residual toner) left on the photoconductor 35, after the toner image formed on the photoconductor 35 is first-transferred onto the intermediate transfer body 32.

The developing unit 38 here has a developer container 36a that has an opening facing the photoconductor 35 and accommodates the two-component developer, a developing roller 38b disposed so as to face the opening of the developer container 38a, and a pair of agitation transport members 38c and 38d that are disposed in the developer container 38a and charge the developer while transporting and simultaneously agitating the developer. The developing unit 38 develops an electrostatic latent image on the photoconductor 35 by applying a developing bias to a region between the developing roller 38b and the photoconductor 35.

The photoconductor cleaner 39 here has a cleaning container 39a having an opening facing the photoconductor 35 and includes a cleaning member 39b having a plate shape and mounted on the opening edge of the cleaning container 39a. In the cleaning container 39a, a transport member 39c for leveling uniformly the removed residue is provided.

Configuration Examples of Intermediate Transfer Body and Transfer Device.

The intermediate transfer body 32 is provided above the plural image forming sections 31 (31a to 31d) along the alignment of the image forming sections 31 and is looped over plural stretching rollers 41 to 44 (four rollers in the present exemplary embodiment). In the present exemplary embodiment, the stretching roller 41 is used as, for example, a driving roller. The stretching roller 42 is used as a counter roller of the transfer device 33 (a transfer roller is used in the present exemplary embodiment), and a second transfer bias is applied to a region between the transfer roller and the counter roller. The stretching roller 43 is used as a tension roller that applies tension to the belt-shaped intermediate transfer body 32.

In addition, a first transfer unit 45 (a first transfer roller is used in the present exemplary embodiment) is provided on the back side of the intermediate transfer body 32 and is opposite to the photoconductor 35 of a corresponding one of the image forming sections 31 (31a to 31d), and a first transfer bias is applied to the first transfer unit 45 so that the image on the photoconductor 35 is transferred onto the intermediate transfer body 32. Moreover, an intermediate transfer body cleaner 46 is provided at the position where the intermediate transfer body 32 is looped over the stretching roller 41. The intermediate transfer body cleaner 46 here includes, in the cleaning container 46a, for example, a cleaning member 46b having a plate shape and a cleaning member 46c having a brush shape. In the cleaning container 46a, a transport member 46d for leveling uniformly the removed residue (for example, residual toner and paper dust) is provided.

Recovery Target Powder Collecting Device
Recovery Target Powder

In the present exemplary embodiment, the powder to be recovered is collected and recovered from two systems, that is, the photoconductor cleaner 39 and the intermediate transfer body cleaner 46.

Figure 3B:
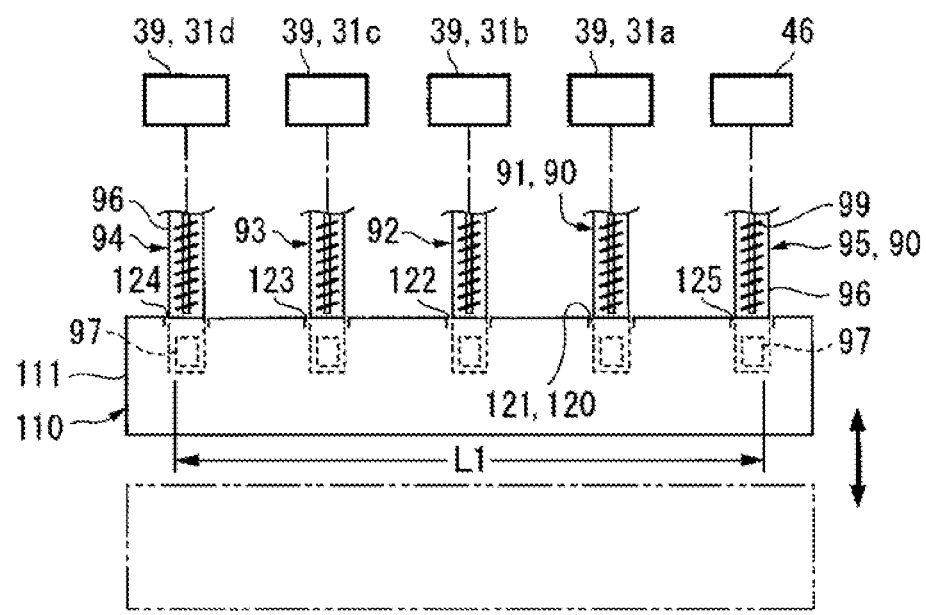
FIG. 3B schematically illustrates the relationship between the image forming engine and a powder recovery device.

(1) The photoconductor cleaner 39 of each of the image forming sections 31 (31a to 31d), as FIG. 3B illustrates, cleans the powder to be recovered (containing largely waste toner) left on the photoconductor 35, and the photoconductor cleaner 39 discharges the waste toner that has been collected therein to the outside from the photoconductor cleaner 39.

(2) The intermediate transfer body cleaner 46 cleans the powder to be recovered (containing largely waste toner and paper dust) left on the intermediate transfer body 32, and the intermediate transfer body cleaner 46 discharges the waste toner and other substances that have been collected therein to the outside from the intermediate transfer body-cleaner 46.

Note that, other than (1) and (2), the powder to be recovered from the developing unit 33 may also be generated. In the instance where a developer such as a two-component developer containing toner and carrier is used, the toner in the developer is largely consumed when the latent image of a corresponding component on the photoconductor 35 is developed. Thus, when the carrier in the developer is consumed little and thus left and if the carrier has aged, the carrier may impair, for example, the charging characteristics of the developer. To prevent such impairment, the aged developer may be discharged as a waste developer to the outside from the developing unit 38 on a regular basis.

It is mentioned that, just to be sure, an instance (3) is not described in the present exemplary embodiment, but such omission does not mean exclusion of the instance (3).

Powder Discharge Device

As FIG. 3B illustrates, the photoconductor cleaners 39 of the image forming sections 31 (31a to 31d) in the present exemplary embodiment have respective powder discharge devices 90 (specifically, 91 to 94). Each of the powder discharge devices 90 is disposed, in the direction where the waste toner in the cleaning container 39a is transported, on the terminal end side of a corresponding one of the cleaning containers 39a.

As FIG. 33 illustrates, the intermediate transfer body cleaner 46 is provided with the powder discharge device 90 (specifically, 95) disposed at the terminal edge of the cleaning container 46a in the direction where the waste toner in the cleaning container 46a is transported.

The powder discharge device 90 in the present exemplary embodiment communicates with and is connected to the cleaning container 39a (or 46a), and the powder discharge device 90 has, on the leading end side, a transport duct 96 having a discharge opening 97 facing downward and has an opening and closing lid 96 (refer to FIGS. 8 and 9A) for opening and closing the discharge opening 97 of the transport duct 96.

Figure 8:
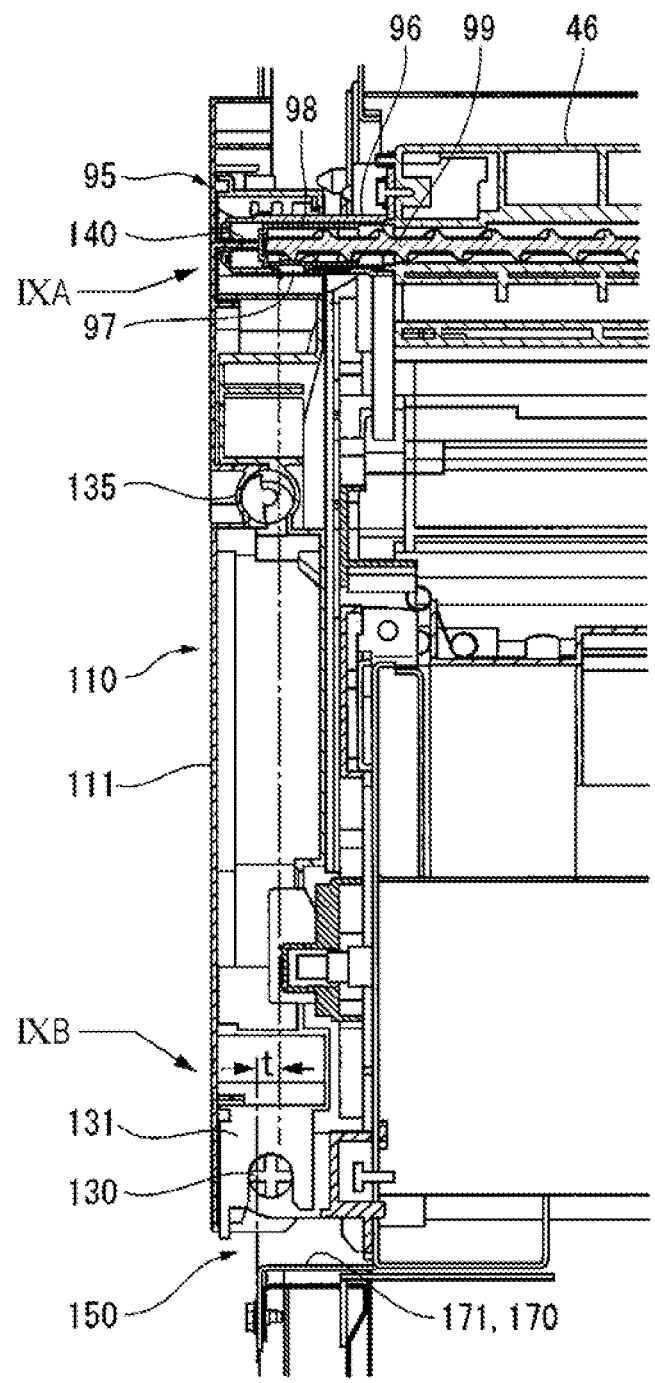
FIG. 8 is a partially cutaway sectional view of the powder recovery device and a powder discharge device with the powder recovery device being attached to the apparatus housing and illustrates the positional relationship therebetween.
Figure 9A:
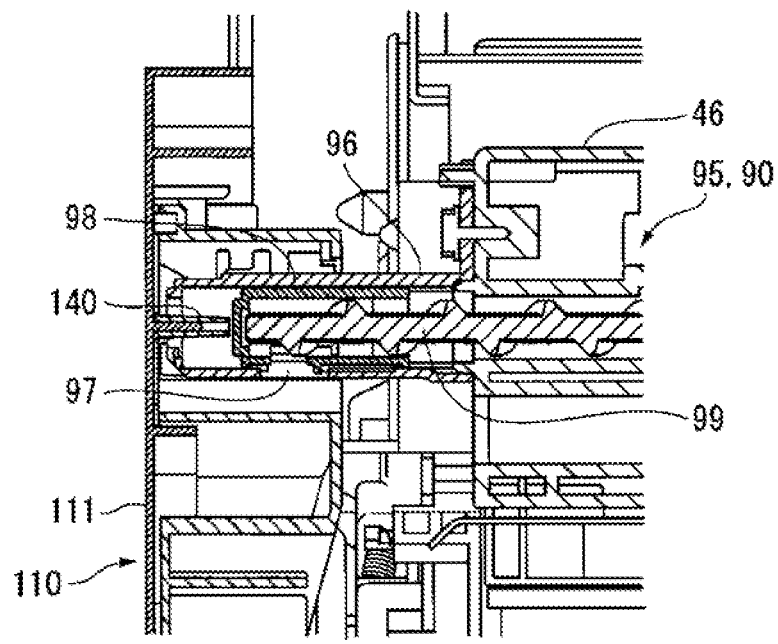
FIG. 9A is an enlarged view or part XXA in FIG. 8.
Figure 9B:
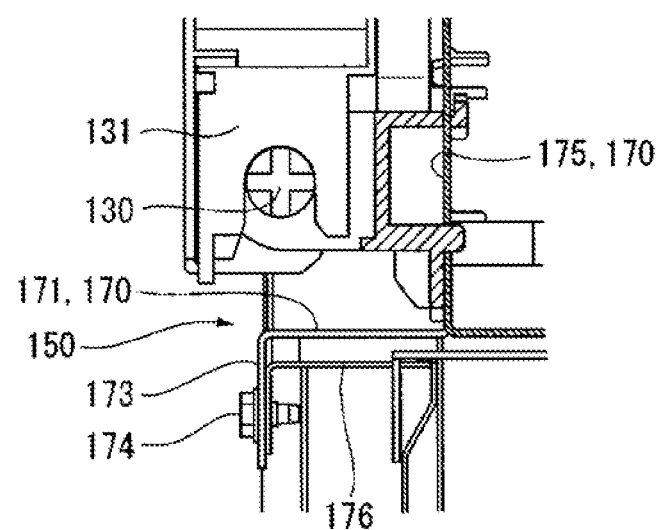
FIG. 9B is an enlarged view of part XXB in FIG. 8.

As FIGS. 8 and 9A illustrate, the transport duct 96 of the present exemplary embodiment has a closed leading end and has a substantially hollow cylindrical shape. In the transport duct 96, a transport member 99 (constituted by, for example, a helical blade formed around a rotating shaft) is provided. The transport member 99 is coaxially coupled to, as one body, the transport member 39c (or 46d) disposed in the cleaning container 39a (or 46a). The transport member 99 transports, to the discharge opening 97, the waste toner that has been transported from the cleaning container 39a (or 46a) into the transport duct 96.

The opening and closing lid 98 is constituted by a hollow cylindrical member that moves between a predetermined open position and a predetermined closed position along the inner periphery of the transport duct 96. The opening and closing lid 98 is moved in the longitudinal direction so as to open and close the discharge opening 97 formed, in the transport duct 96, at a position on the lower side and near a longitudinally protruding end. The opening and closing lid 98 is urged toward the closed position by a torsion spring (not illustrated), and, when a powder recovery device 110 is attached to the apparatus housing 21, the opening and closing lid 98 is engaged with an actuation member 140 of the powder recovery device 110 and moves toward the open position to open the discharge opening 97. Note that, as the actuation member 140 in the present exemplary embodiment, there is used an actuation pin that comes into contact with an end portion of the opening and closing lid 98 through an insertion hole provided at the leading end of the transport duct 96; however, the actuation member 140 is not limited thereto. When an opening and closing lid 96 having a different structure is used, the structure of the actuation member 140 may be selected appropriately according to the structure of the opening and closing lid 98.

Powder Recovery Device

As FIGS. 3B, 4, 8, 9A, and 9B illustrate, the powder recovery device 110 in the present exemplary embodiment has a recovery container 111 that accommodates the recovered powder. On the rear side of the recovery container Hi, recovery openings 120 (specifically, 121 to 125) are formed so that the transport ducts 96 of the powder discharge devices 90 (specifically, 91 to 95) are connectable to the recovery container 111, and each of the recovery openings 120 has an opening and closing lid (not illustrated). The opening and closing lid for the recovery opening 120 here is constituted by, for example, a member made of an elastic film material attached to the inner side of the recovery opening 120 so as to rotate with an upper edge portion being a rotation supporting point, and the member is urged by a torsion spring attached to the rotation supporting point so as to close the recovery opening 120.

As FIGS. 3B and 8 illustrate, the recovery container 111 in the present exemplary embodiment is detachably attached to the front side of the apparatus housing 21 and has a support-point, holder 131 that has a substantially inverted U shape and is swingably caught on a swing support point 130 provided, in advance, on the apparatus housing 21. By the swing support point 130 holding the support-point holder 131, the recovery container 111 swings from an inclined attitude to a vertical attitude to be attached to a predetermined set position of the apparatus housing 21.

The recovery container 111 further includes therein a transport member 135 that transports the recovered powder in the longitudinal direction so as to level the recovered powder.

Problem with Attaching and Detaching of Powder Recovery Device

Figure 10:
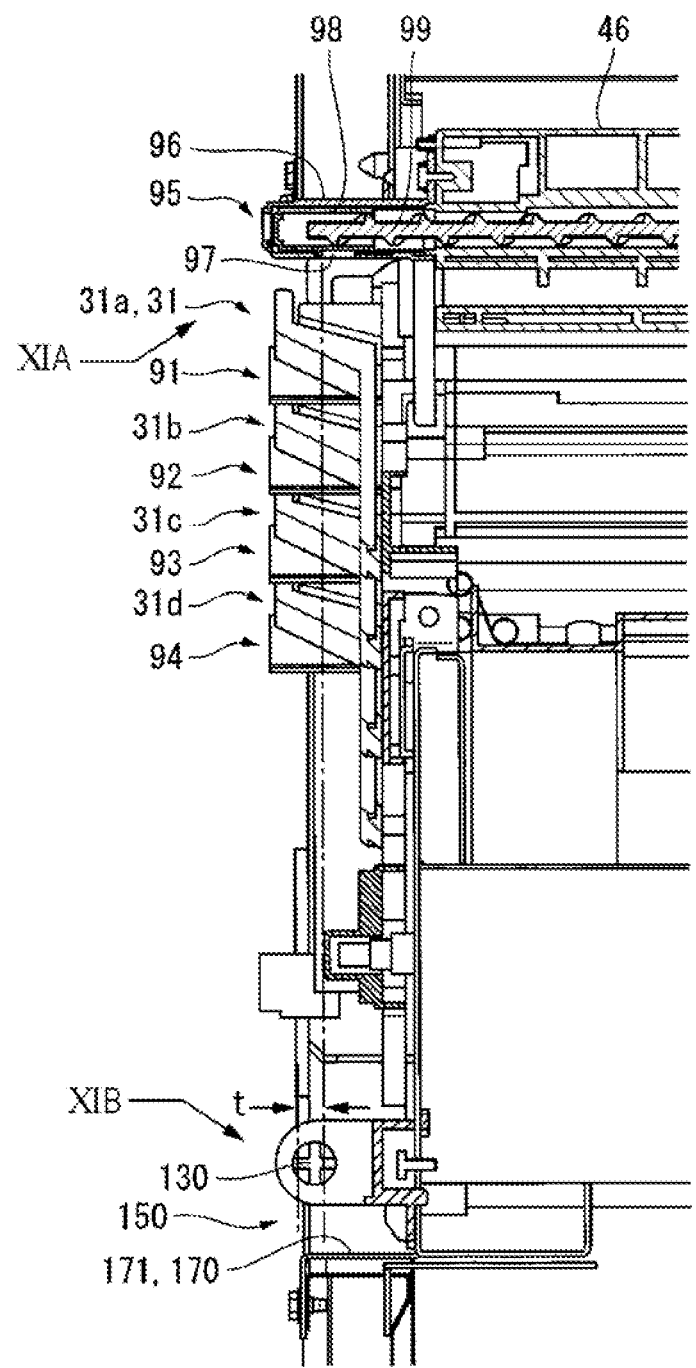
FIG. 10 is a partially cutaway sectional view of the powder discharge device and a powder receiver with the powder recovery device being detached from the apparatus housing and illustrates the positional relationship between the powder discharge device and a powder receiver.
Figure 11A:
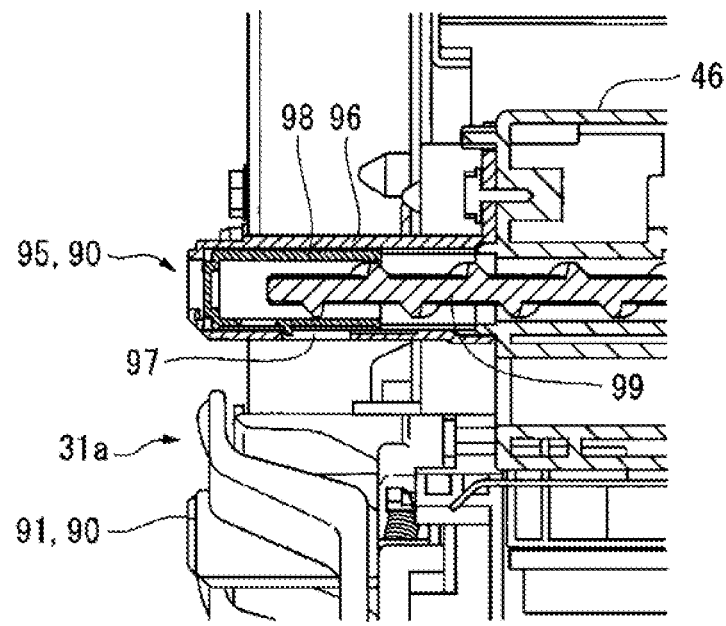
FIG. 11A is an enlarged view of part XIA in FIG. 10.
Figure 11B:
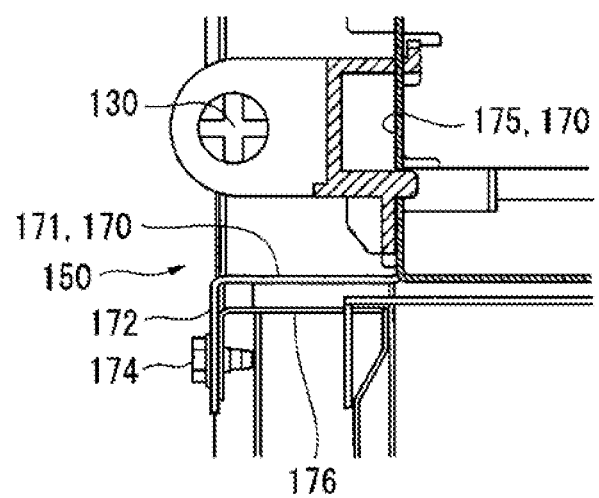
FIG. 11B is an enlarged view of part XIB in FIG. 10.

Regarding the powder recovery device 110 in the present exemplary embodiment, when the powder in the recovery container 111 becomes full, an operation of detaching the powder recovery device 110 is performed. During the operation, as FIGS. 10 and 11A illustrate, each of the discharge openings 97 of the transport, ducts 96 is closed by the opening and closing lid 98 when the transport ducts 96 of the powder discharge devices 90 has been removed from the respective recovery openings 120 (specifically, 121 to 125) of the recovery container 111 of the powder recovery device 110. Although the discharge opening 97 of the transport duct 96 is closed, waste toner of powder may fall from the discharge opening 97 of the transport duct 96 of the powder discharge device 90.

Powder Receiver

Configuration Example of Visor-Shaped Member

In the present exemplary embodiment, a powder receiver 150 is provided on the front side of the apparatus housing 21 and below the powder recovery device 110.

Figure 5:
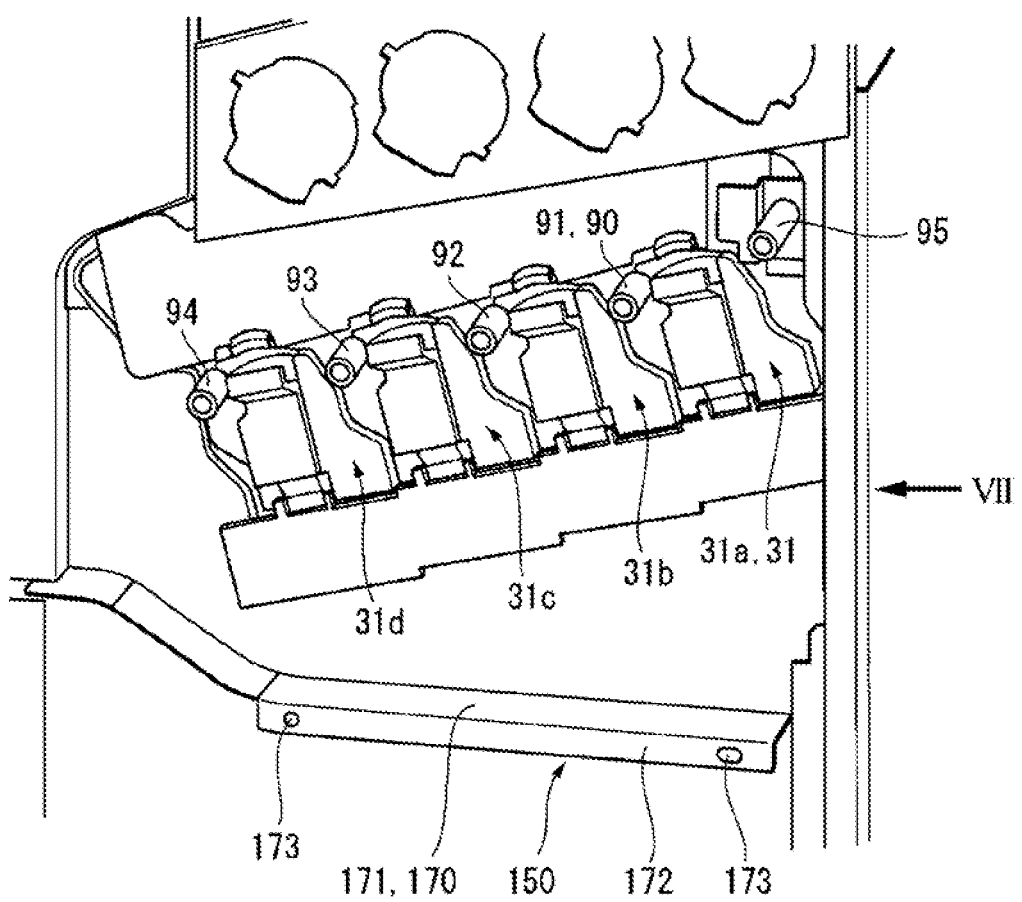
FIG. 5 is a schematic external view of a related part when the powder recovery device is detached from the image forming apparatus in FIG. 4.
Figure 6:
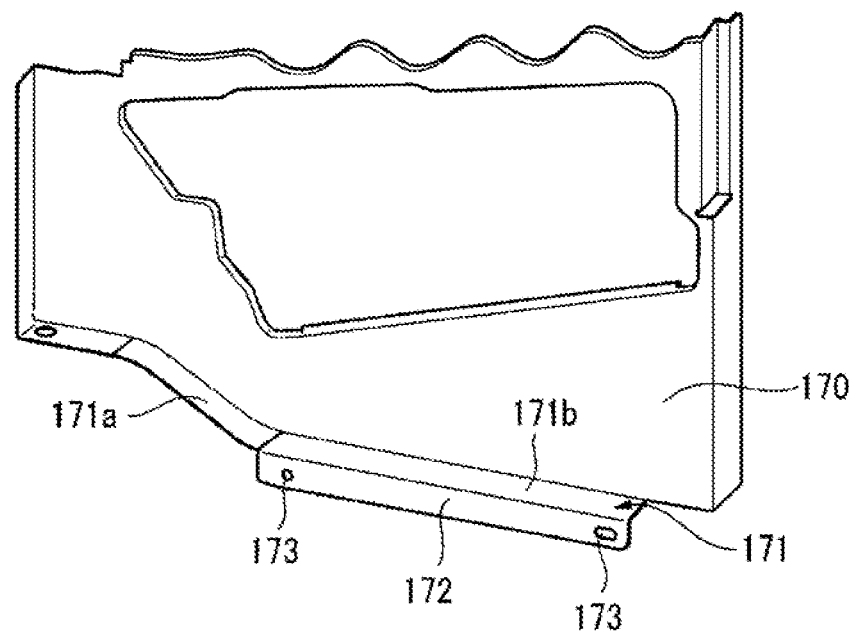
FIG. 6 illustrates a configuration example of a front frame of an apparatus housing.
Figure 7:
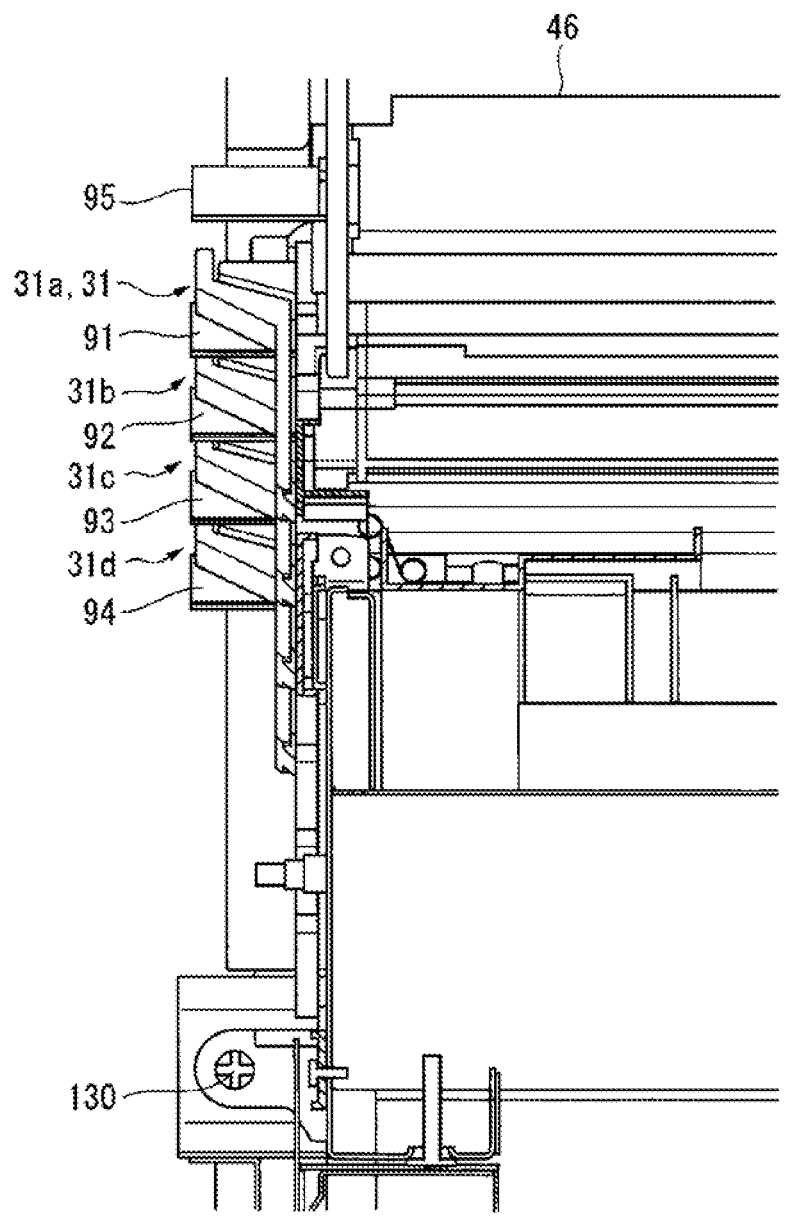
FIG. 7 is a schematic: external view of a related part of the image forming apparatus when viewed from arrow VII in FIG. 5.

As FIGS. 5 and 6 illustrate, the present exemplary embodiment focuses on a frame member 170 constituting an upper region of the front side of the apparatus housing 21, and the powder receiver 150 is constituted by a visor-shaped member 171 integrally formed on a lower end portion of the part of the frame member 170 intersecting in the right-and-left direction.

As FIGS. 10, 11A, 11B, and 12B illustrate, the visor-shaped member 171 in the present exemplary embodiment is formed as a long plate member continuously extending in the right-and-left direction so as to include entirely a region F (refer to FIG. 12A) substantially directly below the discharge openings 97 of the transport ducts 96 of the plural powder discharge devices 90 (specifically, 91 to 95). That is, the visor-shaped member 171 is formed so as to satisfy L>L1, when L1 (refer to FIG. 3B) is a distance, in the right-and-left direction, between the outer sides of the discharge openings 97 of the leftmost powder discharge device 94 (90) and the rightmost powder discharge device 95 (90) in FIG. 3B, and L (refer to FIG. 12B) is a longitudinal dimension of the visor-shaped member 171 in plan view. In addition, adjustment may be performed so as to satisfy |L−L1|>2α, when α mm is the variation, in the horizontal direction, of the powder w falling from the discharge opening 97.

Note that, in the present exemplary embodiment, the lower end portion of the part of the frame member 170 intersecting in the right-and-left direction is shaped so as to have, in the left region, an inclined portion being inclined diagonally downward from the left to the right and have a horizontal portion extending in the substantially horizontal direction from a lower end position of the inclined portion toward the right region, and the visor-shaped member 171 extends in the longitudinal direction along such a shape of the frame member 170 while being bent in the middle so as to have a gentle V shape (an inclined portion 171a and a horizontal portion 171b); however, the shape of the visor-shaped member 171 is not limited thereto and may certainly have, for example, a linear shape extending in the longitudinal direction.

As FIGS. 10, 11A, 11B, and 12A illustrate, the visor-shaped member 171 in the present exemplary embodiment sticks out substantially horizontally in a sticking-out direction relative to a vertical wall 175 of the frame member 170 extending in the vertical direction. The protruding end of the visor-shaped member 171 on the front side of the apparatus housing 21 is positioned further toward the outside of the apparatus housing 21, by a distance t (2 mm or more in the present exemplary embodiment), than the discharge openings 57 of the transport ducts 96 of the powder discharge devices 90 (specifically, 91 to 95).

In the present exemplary embodiment, the visor-shaped member 171 has the substantially same width-direction dimension d (refer to FIG. 12B) intersecting the longitudinal direction throughout the visor-shaped member 171, and the visor-shaped member 171 thereby has a simple shape with which easy manufacturing may be achieved.

At this time, although the visor-shaped member 171 may be usable even if the distance t is less than 2 mm, it is verified that, by protruding by 2 mm or more, the visor-shaped member 171 stably receives powder even if the variation, in the horizontal direction, when the powder w falls down is considered.

In the visor-shaped member 171 in the present exemplary embodiment, a bent flange 172 being bent downward is provided on a portion of the horizontal portion 171b on the front side of the apparatus housing 21. The bent flange 172 has plural mounting holes 173 for fasteners and is fixed to, fox example, a lower frame member 176 of the apparatus housing 21 connected to the bent flange 172 by a fastener 174. Note that at least one of the plural mounting holes 173 may be formed as an elongated hole extending in the longitudinal direction of the visor-shaped member 171 and may be enable adjustment of a mounting error of the visor-shaped member 171.

Thus, no mounting holes are provided in the region of the visor-shaped member 171 entirely including regions substantially directly below the discharge openings 97 of the powder discharge devices 90 (specifically, 91 to 95), and there is thus no concern about the possibility that the powder failing from the discharge opening 97 falls downward through the mounting hole region of the visor-shaped member 171.

Figure 12A:
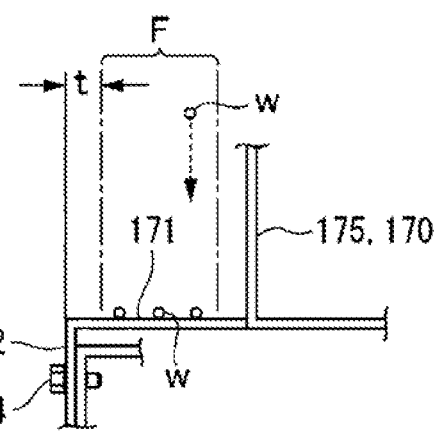
FIG. 12A schematically illustrates a function of the powder receiver used in the first exemplary embodiment.
Figure 12B:
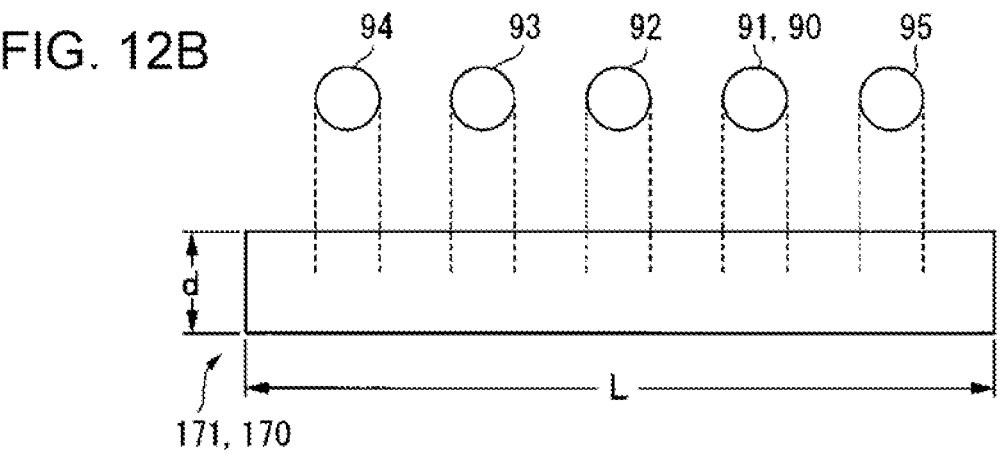
FIG. 12B schematically illustrates a receiving range in which the powder receiver used in the first exemplary embodiment receives the powder falling from a discharge portion of each powder discharge device.

In addition, as FIG. 12A illustrates, the visor-shaped member 171 in the present exemplary embodiment is configured by utilizing a portion of the frame member 170. When such a portion of the frame member 173 is the vertical wall 175 extending in the up-and-down direction and if the visor-shaped member 171 protrudes from a bottom portion of the vertical wall 175, the powder w that has fallen on the visor-shaped member 171 may effectively be prevented from entering inside the apparatus lousing 21.

Relationship between Visor-Shaped Member and Medium Supply Device.

In the present exemplary embodiment, as FIGS. 2B and 4 illustrate, the medium supply device 40 (medium supply portions 40a to 40c) is mounted in a lower region of the apparatus housing 21.

The medium supply device 40 in the present exemplary embodiment is typically positioned below the image forming engine 30, the powder discharge devices 90, and the powder recovery device 110.

At this time, the powder receiver 150 is positioned above the medium supply device 40 and disposed so as to protrude further toward the user operation side than an operation portion (operation handle 40h) of the medium supply device 40 that a user operates.

Thus, the powder receiver 150 is capable of receiving powder when the powder recovery device 110 is detached from the apparatus housing 21 and even if the powder fails from the discharge openings 97 of the transport ducts 96 of the powder discharge devices 90 (91 to 95). Accordingly, there may be no concern that the powder might foul the operation handle 40h of the medium supply device 40, and there may be almost no concern that a medium might be fouled during an operation of adding a medium at the medium supply device 40.

Although being configured as described above, the powder receiver 150 in the present exemplary embodiment is not limited thereto and may be configured as, for example, a first modification and a second modification describe.

First Modification

Figure 12C:
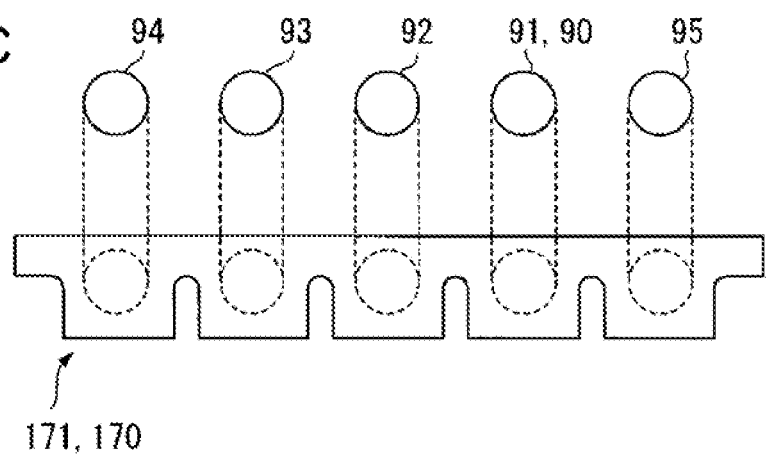
FIG. 12C illustrates a related part of a powder receiver according to a first modification.

Although the powder receiver 150 in the first exemplary embodiment is constituted by the visor-shaped member 171 having a long width-direction dimension d, the powder receiver 150 is not limited thereto. As FIG. 12C illustrates, the width-direction dimension of a portion of the visor-shaped member 171 corresponding to the discharge opening 97 of the transport duct 96 of each of the powder discharge devices 90 (specifically, 91 to 95) may be larger than the width-direction dimension of the other portion of the visor-shaped member 171 because a large amount of powder is considered to fall on the portion corresponding to the discharge opening 57.

Second Modification

Figure 12D:
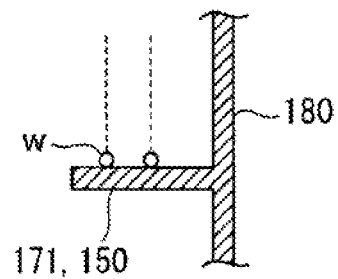
FIG. 12D illustrates a related part of a powder receiver according to a second modification.

Although, in the first exemplary embodiment, the visor-shaped member 171 is integrally formed on the frame member 170 by utilizing a portion of the frame member 170 as the visor-shaped member 171, the configuration of the visor-shaped member 171 is not limited thereto and may be attached to the apparatus housing 21 as a separated body. Alternatively, as FIG. 12D illustrates, an interior material 180 that, is a housing element of the apparatus housing 21 is utilized, and a visor-shaped member 171 serving as the powder receiver 150 may be integrally formed on the interior material 180 or mounted on the interior material 180 as a separated body.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as ace suited to the particular use contemplated. It is intended that the scope of the disclosure be defined by the following claims and their equivalents.

What is claimed is:

1. A processing apparatus, comprising:
   an apparatus housing;
   a powder processing unit that is mounted in the apparatus housing and performs processing with powder;
   a powder recovery unit that is detachably attached to the apparatus housing and recovers powder discharged from the powder processing unit;
   a powder discharge unit extending from the powder processing unit toward the powder recovery unit, the powder discharge unit having a discharge portion, the powder discharge unit transporting and discharging the powder to be recovered, to the powder recovery unit;
   a powder receiver positioned below the powder recovery unit, the powder receiver being provided on the apparatus housing on a side where the powder recovery unit is detached from the apparatus housing, the powder receiver receiving powder falling from the discharge portion of the powder discharge unit when the powder recovery unit is detached from the apparatus housing; and
   a medium container provided, in the apparatus housing, below the powder processing unit, the powder recovery unit, and the powder discharge unit, the medium container having an operation portion that a user operates, wherein:
   the powder receiver is positioned above the medium container and protrudes further toward a user operation side than the operation portion of the medium container, the apparatus housing has an opening through which the powder recovery unit is attached to and detached from the apparatus housing, the powder recovery unit and the medium container face the opening, and the apparatus housing has an opening and closing door capable of closing the opening so as to conceal entirely the powder recovery unit and the medium container.

2. The processing apparatus according to claim 1,
wherein the opening and closing door is at an open position in a region other than a region below the powder recovery unit when the opening is open.

3. The processing apparatus according to claim 1,
wherein the apparatus housing has a frame member forming a frame of the apparatus housing, an exterior member covering an outer side of the frame member, and an interior member provided on an inner side of the exterior member, and wherein the powder receiver is integrally or separately provided on at least one of the frame member and the interior member.

4. The processing apparatus according to claim 3,
wherein the powder receiver, which has a shape of a visor, protrudes from a bottom portion of a vertical wall, extending in an up-and-down direction, of at least one of the frame member and the interior member.

5. The processing apparatus according to claim 1,
wherein the powder receiver is a visor-shaped member protruding further toward the side where the powder recovery unit is detached from the apparatus housing than the discharge portion of the powder discharge unit.

6. The processing apparatus according to claim 5,
wherein the apparatus housing has a frame member forming a frame of the apparatus housing, an exterior member covering an outer side of the frame member, and an interior member provided on an inner side of the exterior member, and wherein the powder receiver is integrally or separately provided on at least one of the frame member and the interior member.

7. The processing apparatus according to claim 6,
wherein the powder receiver, which has a shape of a visor, protrudes from a bottom portion of a vertical wall, extending in an up-and-down direction, of at least one of the frame member and the interior member.

8. The processing apparatus according to claim 5,
wherein the visor-shaped member serving as the powder receiver continuously extends in a direction intersecting the opening.

9. The processing apparatus according to claim 8,
wherein the apparatus housing has a frame member forming a frame of the apparatus housing, an exterior member covering an outer side of the frame member, and an interior member provided on an inner side of the exterior member, and wherein the powder receiver is integrally or separately provided on at least one of the frame member and the interior member.

10. The processing apparatus according to claim 9,
wherein the powder receiver, which has a shape of a visor, protrudes from a bottom portion of a vertical wall, extending in an up-and-down direction, of at least one of the frame member and the interior member.

11. A processing apparatus, comprising:
an apparatus housing;
a powder processing unit that is mounted in the apparatus housing and performs processing with powder;
a powder recovery unit that is detachably attached to the apparatus housing and recovers powder discharged from the powder processing unit;
a powder discharge unit extending from the powder processing unit toward the powder recovery unit, the powder discharge unit having a discharge portion, the powder discharge unit transporting and discharging the powder to be recovered, to the powder recovery unit; and
a powder receiver positioned below the powder recovery unit, the powder receiver being provided on the apparatus housing on a side where the powder recovery unit is detached from the apparatus housing, the powder receiver protruding further toward the side where the powder recovery unit is detached from the apparatus housing than the discharge portion of the powder discharge unit by 2 mm or more; and
a medium container provided, in the apparatus housing, below the powder processing unit, the powder recovery unit, and the powder discharge unit, the medium container having an operation portion that a user operates, wherein:

the powder receiver is positioned above the medium container and protrudes further toward a user operation side than the operation portion of the medium container, the apparatus housing has an opening through which the powder recovery unit is attached to and detached from the apparatus housing, the powder recovery unit and the medium container face the opening, and the apparatus housing has an opening and closing door capable of closing the opening so as to conceal entirely the powder recovery unit and the medium container.

12. The processing apparatus according to claim 11,
wherein the apparatus housing has a frame member forming a frame of the apparatus housing, an exterior member covering an outer side of the frame member, and an interior member provided on an inner side of the exterior member, and wherein the powder receiver is integrally or separately provided on at least one of the frame member and the interior member.

13. The processing apparatus according to claim 12,
wherein the powder receiver, which has a shape of a visor, protrudes from a bottom portion of a vertical wall, extending in an up-and-down direction, of at least one of the frame member and the interior member.

14. The processing apparatus according to claim 11,
wherein the powder receiver, which protrudes further toward the side where the powder recovery unit is detached from the apparatus housing than the discharge portion of the powder discharge unit, is a visor-shaped member.

15. The processing apparatus according to claim 14,
wherein the visor-shaped member serving as the powder receiver continuously extends in a direction intersecting the opening.

16. The processing apparatus according to claim 15,
wherein the apparatus housing has a frame member forming a frame of the apparatus housing, an exterior member covering an outer side of the frame member, and an interior member provided on an inner side of the exterior member, and wherein the powder receiver is integrally or separately provided on at least one of the frame member and the interior member.

17. The processing apparatus according to claim 14,
wherein the apparatus housing has a frame member forming a frame of the apparatus housing, an exterior member covering an outer side of the frame member, and an interior member provided on an inner side of the exterior member, and
wherein the powder receiver is integrally or separately provided on at least one of the frame member and the interior member.

18. The processing apparatus according to claim 17,
wherein the powder receiver, which has a shape of a visor, protrudes from a bottom portion of a vertical wall, extending in an up-and-down direction, of at least one of the frame member and the interior member.

* * * * *